United States Patent
Denaci

[19]

[11] Patent Number: 5,844,383
[45] Date of Patent: Dec. 1, 1998

[54] GAS TURBINE ENGINE STARTING SYSTEM AND METHOD

[75] Inventor: Edward Neil Denaci, San Diego, Calif.

[73] Assignee: Sundstrand Corporation, Rockford, Ill.

[21] Appl. No.: 892,984

[22] Filed: Jul. 15, 1997

[51] Int. Cl.⁶ .................................................. H02P 1/00
[52] U.S. Cl. .................... 318/139; 318/473; 318/461; 318/484; 701/113; 123/179.3; 290/38 R
[58] Field of Search ..................................... 318/139, 445, 318/446, 447, 461–465, 471–473, 478, 479, 484–487; 701/113; 123/424, 179.1, 179.3, 179.28; 290/38 R

[56] References Cited

U.S. PATENT DOCUMENTS

| | | | |
|---|---|---|---|
| 4,088,109 | 5/1978 | Woodruff et al. | 123/179.21 |
| 4,246,639 | 1/1981 | Carp et al. | 701/113 |
| 4,456,831 | 6/1984 | Kanegae et al. | 290/38 R |
| 4,796,208 | 1/1989 | Kumagai et al. | 364/559 |
| 4,901,690 | 2/1990 | Cummins et al. | 123/179.3 |
| 5,075,616 | 12/1991 | Mitsui | 322/10 |
| 5,222,469 | 6/1993 | Sutton | 123/198 DC |
| 5,428,275 | 6/1995 | Carr et al. | 318/146 |
| 5,430,362 | 7/1995 | Carr et al. | 318/779 |
| 5,461,289 | 10/1995 | Adler et al. | 318/139 |
| 5,482,013 | 1/1996 | Andrews et al. | 123/179.21 |
| 5,482,022 | 1/1996 | Aoki et al. | 123/479 |
| 5,742,137 | 4/1998 | Bratton et al. | 318/139 |

*Primary Examiner*—Brian Sircus
*Attorney, Agent, or Firm*—Marshall, O'Toole, Gerstein, Murray & Borun

[57] ABSTRACT

A starting system and method for a gas turbine engine checks to determine whether ignition has occurred in a light off window. If such ignition has not occurred, a starter coupled to the gas turbine engine is deactuated to allow deceleration through the light off window while still attempting to ignite gases in the combustor. By providing an extra interval of time to achieve ignition, start reliability is enhanced.

8 Claims, 4 Drawing Sheets

GAS TURBINE ENGINE STARTING SYSTEM AND METHOD

TECHNICAL FIELD

The present invention relates generally to gas turbine engines, and more particularly to a starting system and method that provides enhanced start reliability for a gas turbine engine.

BACKGROUND ART

In a typical start system for a gas turbine engine, for example, one used in an auxiliary power unit, a start sequence that coordinates engine speed, ignition and fuel delivery mechanisms is required to achieve a reliable start. Conventionally, a motive power source, such as a dedicated starter motor or a starter-generator, is drivably coupled to the gas turbine engine and is operated to produce rotation thereof. As the starter accelerates the engine, a fuel delivery pump and an igniter are actuated to effect ignition in a combustor of the engine. Upon successful ignition of the engine and once the engine has reached a self-sustaining speed the starter is disengaged. However, failure to achieve ignition for the first start of the day is a common problem with gas turbine engines.

For successful ignition, engine speed and fuel delivery must be coordinated to provide an air fuel mass mixture at the igniter capable of sustaining combustion. The range of engine speeds at which starting is most likely to occur is referred to as the "light off window" and typically ranges from 5%–20% of rated engine speed. If the starter accelerates too quickly through the light off window, the constant displacement fuel pump will have an insufficient amount of time to deliver fuel to the start fuel nozzle, thereby resulting in failed ignition.

Additionally, the igniter operates at a rate of 3 to 10 discharges per second. Thus, rapid acceleration through the light off window also limits the number of igniter discharges occurring within the window, further reducing the likelihood of successful ignition.

Further, a high power starter is often necessary to ensure engine start on a cold day when battery supply is low. However, the same starter is likely to be capable of very fast engine acceleration on a warm day with a very highly charged battery, thereby hindering engine start. Thus, starter-generators that typically have very high torque capabilities most often present start difficulties due to rapid acceleration, although even start systems that employ a separate starter and generator frequently experience similar problems.

To increase gas turbine engine start reliability the prior art provides methods of controlling the acceleration of the starter to prolong the duration of the light off window and thereby ensure adequate time for fuel delivery. For example, U.S. Pat. No. 5,428,275 to Carr et al., (assigned to the assignee of the present application) describes a method for controlling starter acceleration by regulating the power supplied to the starter. Using this method, starter acceleration is stepped through three controlled phases during which the starter accelerates at three distinct, predetermined rates to extend the amount of time that the engine speed remains within the light off window.

Similarly, U.S. Pat. No. 5,430,362 also to Carr et al., (also assigned to the assignee of the present application) describes an engine starting system that regulates starter acceleration via a controllable power source responsive to acceleration detection means. The power source is thus controlled to cause three distinct phases of starter acceleration, the second of which prolongs the duration of the light off window.

Although the prior art describes methods for effectively controlling the starter acceleration, thereby increasing the likelihood of successful ignition, the systems require additional circuitry and complexity that add cost and weight to the engine design.

SUMMARY OF THE INVENTION

In accordance with the present invention, a system and method for starting a gas turbine engine increases the likelihood of successful start.

More particularly, according to one aspect of the present invention, a starting system is drivably coupled to a gas turbine engine that includes a rotor, an igniter and a fuel valve. The system comprises means for actuating the starter to accelerate the rotor during a start sequence and means for operating the igniter and the fuel valve during the start sequence. Means are also provided for developing an indication when ignition has failed to occur during a rotor speed window of the start sequence and means responsive to the developing means for deactuating the starter to allow the rotor to decelerate when the indication is developed. The system further includes means for reactuating the starter subsequent to deactuation thereof if ignition is thereafter detected during the start sequence.

The starting system of the present invention provides enhanced start reliability for a gas turbine engine by enabling ignition during engine speed coast down after a failed start sequence. Thus, engine deceleration through the light off window presents a second opportunity for ignition. In addition to providing a second attempt at ignition, the system is further advantageous because gas turbine engine speed coast down occurs slowly, thereby prolonging the duration of the light off window and ensuring adequate time for fuel delivery. Further, the system eliminates the added cost and complexity inherent in starting systems that employ starter acceleration control circuitry to prolong the duration of the light off window.

DESCRIPTION OF THE PREFERRED EMBODIMENT

Figure 1:
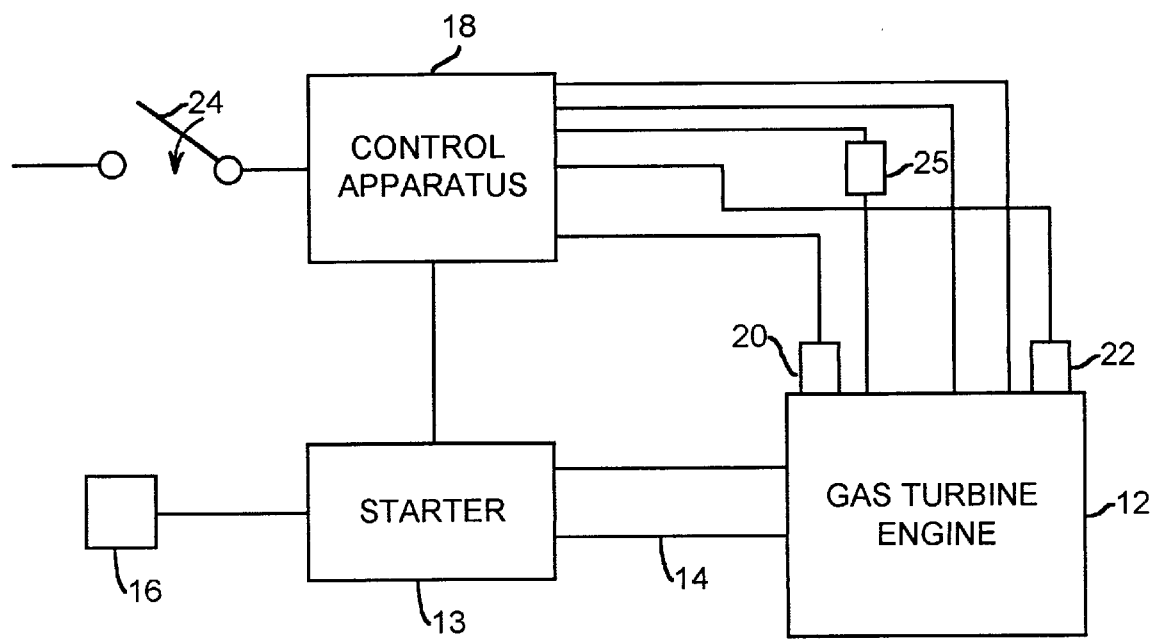
FIG. 1 comprises a block diagram of a gas turbine engine in combination with the starting system of the present invention.

Referring now to FIG. 1, a gas turbine engine 12 is operable during a starting sequence to receive motive power supplied by a starter 13 via a motive power shaft 14 coupled to a rotor (not shown in FIG. 1) of the gas turbine engine 12. During operation in the starting sequence, the starter 13 receives electrical power from a power source 16, which may comprise a battery or other AC or DC power source. The starter 13 may comprise a dedicated starter motor or may comprise any other machine capable of developing motive power, such as a starter/generator. The starter 13 is responsive to signals supplied by a control apparatus 18, which in turn is responsive to signals developed by sensors 20 and 22 which sense the speed of the rotor of the gas turbine engine 12 as well as the exhaust gas temperature thereof, respectively. The control apparatus 18 is further responsive to a command signal which may be developed through manual actuation of a switch 24 to initiate or terminate a start sequence.

The control apparatus 18 further controls an exciter 25 as well as other devices described in greater detail hereinafter.

Figure 2:
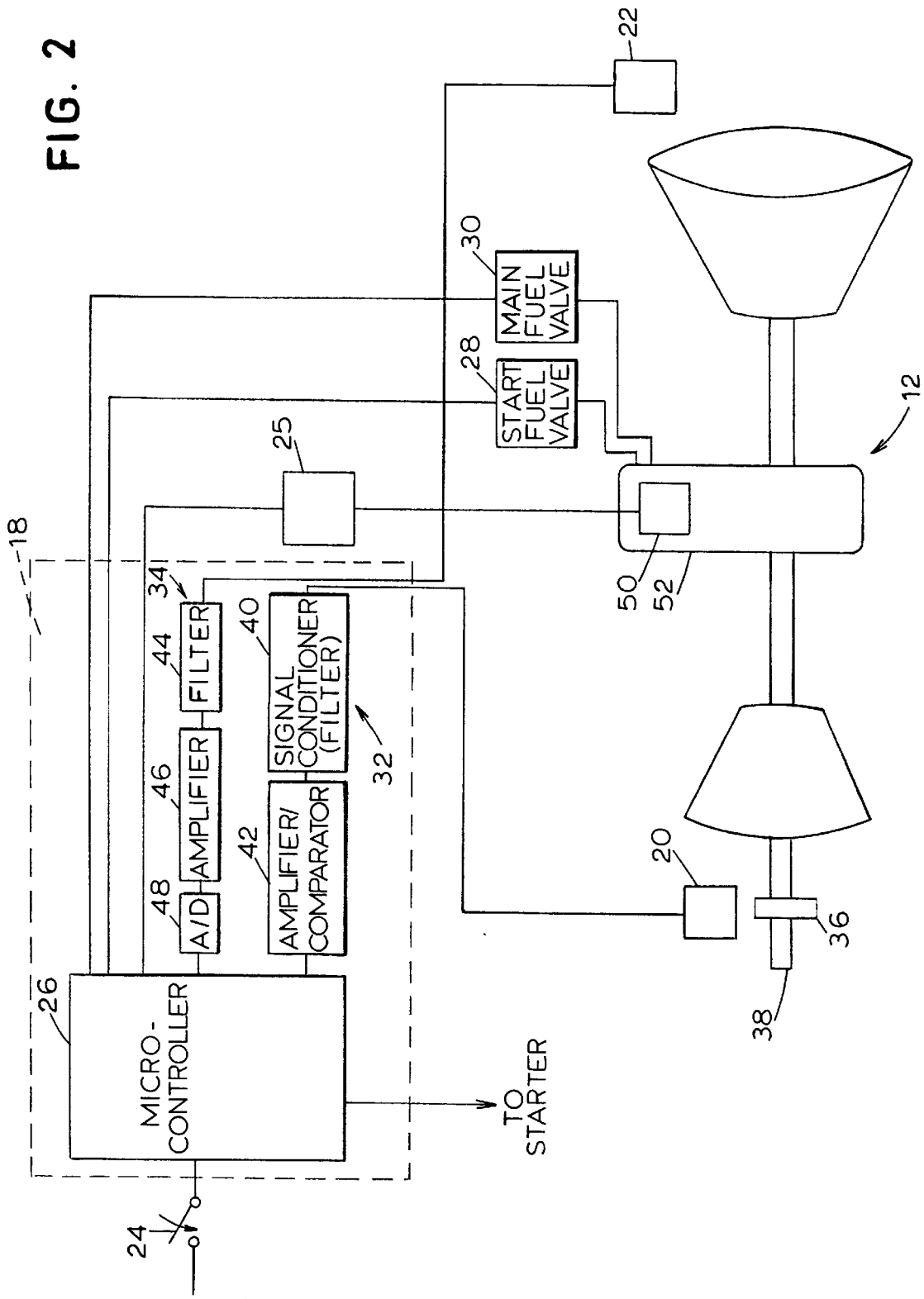
FIG. 2 comprises a block diagram of the starting system including a control apparatus, an ignition sensor, an engine speed sensor and an exciter together with the gas turbine engine.

FIG. 2 illustrates the control apparatus 18 in greater detail, together with the gas turbine engine 12. The control apparatus 18 includes a microcontroller 26 which may be implemented by a suitably programmed microprocessor or any other processing device, together with any interface apparatus necessary to control the starter 13, exciter 25 and start and main fuel valves 28, 30 described in greater detail hereinafter. The microcontroller 26 is responsive to the start command provided by the switch 24, as previously noted, and further receives signals from signal conditioning circuits 32, 34 which are in turn responsive to the signals developed by the sensors 20, 22. The sensor 20 may comprise a magnetic pickup (MPU) which is responsive to a ferromagnetic body 36 mounted for rotation on a rotor 38 of the gas turbine engine 12. The body 36 may have a lobe, gear tooth or one or more other projections, the passage of which is sensed by the MPU 20. The signal developed by the MPU 20 is conditioned by a filter 40 and is amplified and compared to a reference by a circuit 42 and the resulting comparison signal is supplied to the microcontroller 26.

The sensor 22, which may comprise a thermocouple or other device capable of detecting exhaust gas temperature, develops an output signal which is filtered by a filter circuit 44 and amplified by a circuit 46 to a suitable level. An analog to digital (A/D) converter 48 converts the output of the amplifier 46 into a digital signal suitable for the microcontroller 26. In response to the signals developed by the sensors 20, 22, the microcontroller 26 commands the exciter 25 to operate an igniter 50 located in a combustor 52 of the gas turbine engine 12 to provide ignition discharges for igniting a fuel air mixture in the combustor 52. During operation in the starting mode, the microcontroller 26 initially operates the start fuel valve 28 to provide a first metered quantity of fuel appropriate for starting to the combustor 52. Thereafter, the main fuel valve 30 is operated to provide a second, different metered quantity of fuel to the combustor 52 suitable for normal operation of the gas turbine engine 12.

If desired, the separate start and main fuel valves 28, 30 may instead be replaced by a single fuel valve which is capable of providing varying quantities of fuel to the combustor 52 during operation in the start sequence and thereafter during normal operation of the gas turbine engine 12.

Figure 3A:
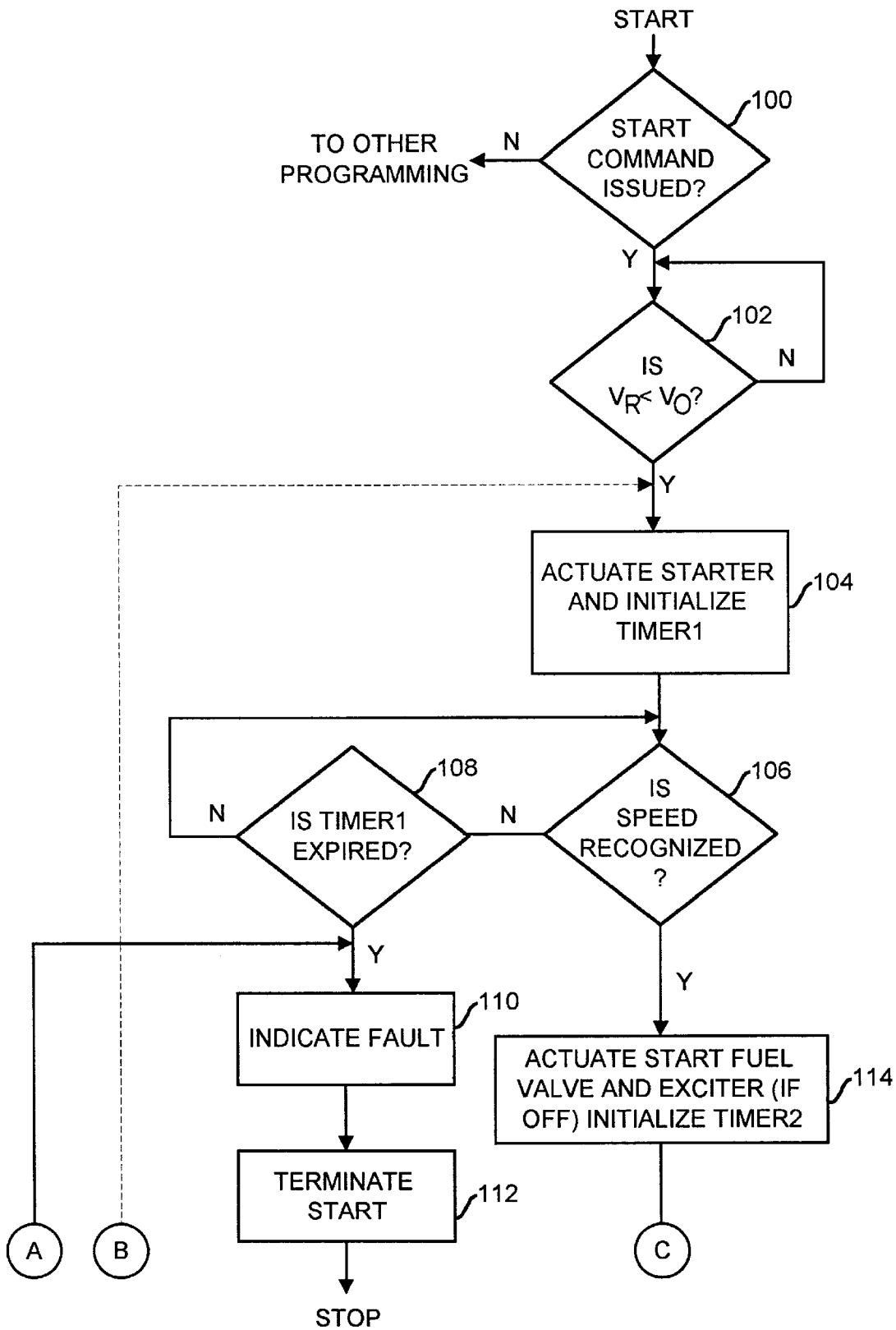
FIGS. 3a and 3b, when joined along similarly-lettered lines, together comprise flow charts of a start sequence implemented by the starting system of the present invention to effect start of the gas turbine engine.
Figure 3B:
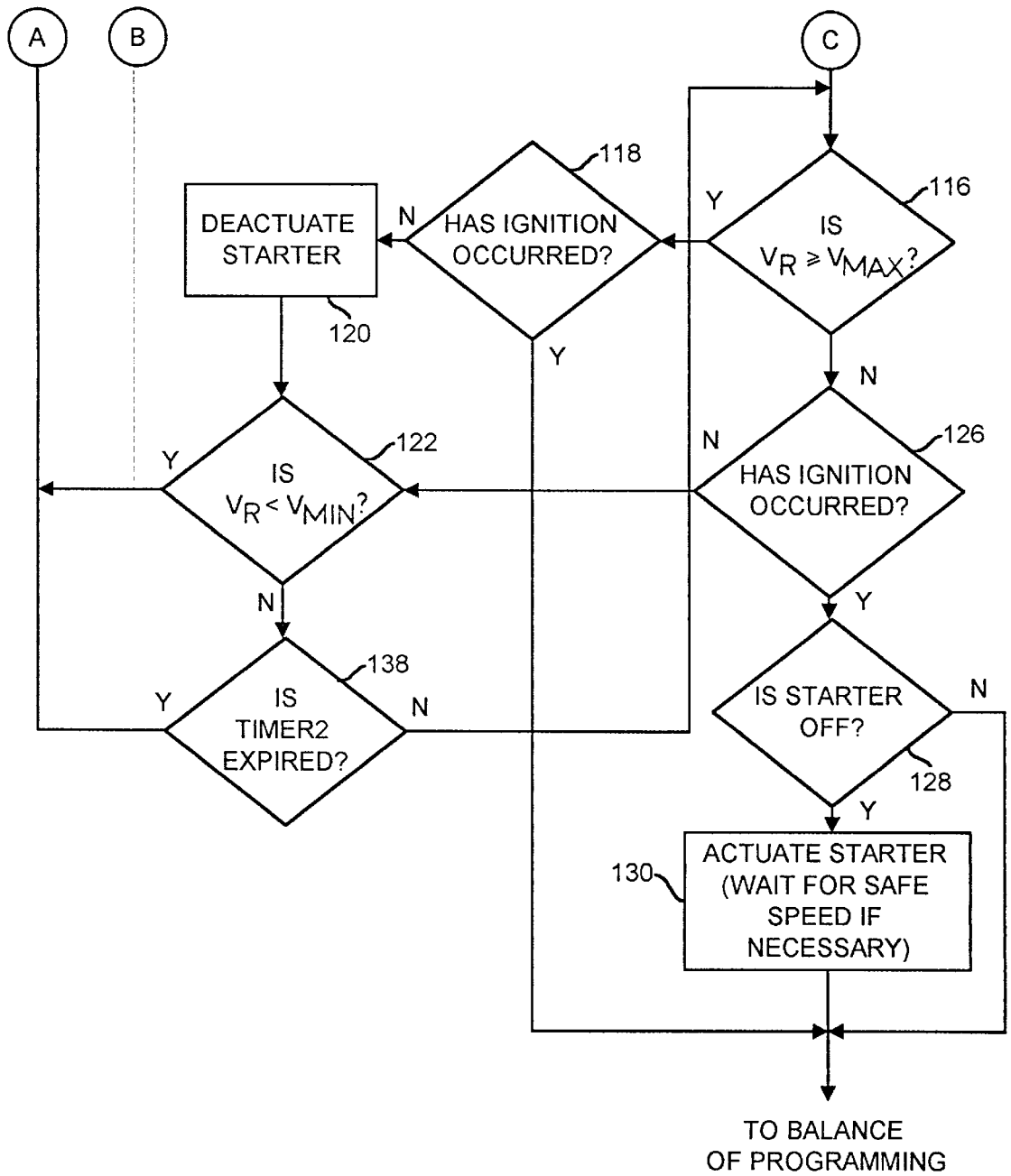

FIGS. 3a and 3b illustrate programming that may be executed by the microcontroller 26 to implement the starting system and method of the present invention. The starting system of the present invention provides enhanced start reliability for a gas turbine engine 12 by providing a second opportunity for ignition after a failed start sequence. In particular, the control apparatus 18 actuates the starter 13 causing the gas turbine engine 12 to accelerate. The control apparatus 18 also actuates the exciter 25 and opens start fuel supply valve 28 to supply fuel to the combustor 52 of the engine 12. For successful ignition, the engine speed must be coordinated with fuel delivery to cause the formation of a fuel air mass mixture at the igniter capable of sustaining combustion. If ignition fails to occur once the engine has accelerated through the light off window, the starter is deenergized thereby causing the engine to decelerate. Since the exciter 25 and start fuel supply valve 28 are still energized, ignition may occur as the engine 12 decelerates through the light off window. Further, the slow speed at which gas turbine engine coast down occurs prolongs the duration of the light off window insuring adequate time for fuel delivery.

Referring specifically to FIG. 3a, once a block 100 determines that a start command has been issued via the switch 24, a block 102 checks the speed $V_R$ developed by the amplifier/comparator 42 to determine whether it is less than a speed $V_0$ representing the maximum safe speed for the starter 13. Once the rotor speed $V_R$ is less than the maximum safe starter speed $V_0$, a block 104 actuates the starter 13 and initializes a timer TIMER1. A block 106 then checks to determine whether the speed of the rotor 38 has been recognized, verifying that the engine is rotating. If a block 108 determines that the speed of the rotor 38 has not been recognized within a period of time established by TIMER1, a block 110 indicates the existence of a fault and the start sequence is terminated by a block 112. If the block 108 determines that TIMER1 has not expired, control returns to the block 106 and remains with the blocks 106 and 108 until the speed is recognized or TIMER1 expires.

If the block 106 recognizes the speed of the rotor 38, a block 114 actuates the start fuel valve 28 and the exciter 25, if such elements have not already been actuated in previous passes through the programming. In addition, a timer TIMER2 is initialized.

A block 116, FIG. 3b, then checks to determine whether the speed $V_R$ of the rotor 38 is greater than a speed $V_{MAX}$ representing the upper limit of the light off window. If this is true, then a block 118 checks to determine whether ignition has occurred. This is accomplished by checking the output of the A/D converter 48 which, as noted previously, is responsive to the exhaust gas sensor 22. If ignition has not occurred, then it has been ascertained that the rotor speed $V_R$ has exceeded the light off window without ignition, and hence a block 120 deactuates the starter 13. Control then passes to a block 122. Conversely, if the block 118 determines that ignition has occurred, then control passes to other programming executed by the microcontroller 26 which may, for example, actuate the main fuel valve and deactuate the start fuel valve, the exciter and the starter at later point(s) in the start sequence.

If the block 116 determines that the speed $V_R$ of the rotor 38 is less than or equal to the upper limit of the light off window $V_{MAX}$, a block 126 checks to determine whether ignition has occurred. If so, a block 128 checks to determine whether the starter 13 is off or deactuated and, if so, a block 130 actuates the starter 13. In this regard, before actuating the starter the block 130 waits to determine that the rotor 38 has reached the speed which is safe for operation of the starter 13. Following the block 130 and, following the block 128 if such block determines that the starter is not off, control passes to the remaining programming executed by the microcontroller 26.

Following the block 126 if ignition has not occurred, or the block 120, the block 122 checks to determine whether the rotor speed $V_R$ is less than a speed $V_{MIN}$ representing the lower limit of the light off window. If this is true, then starting has failed to occur even though the rotor speed has accelerated and thereafter decelerated through the light off window. Accordingly, control passes to the blocks 110 and 112, FIG. 3a, where a fault is indicated and starting is terminated.

If the block 122 determines that the rotor speed $V_R$ is still greater than the minimum light off speed, a block 138 checks to determine whether TIMER2 has expired, if not, control returns to the block 116 and other blocks subsequent thereto as described above. If TIMER2 has expired, then starting has not occurred within a predetermined time period, and hence control passes to the blocks 110 and 112, FIG. 3a, where a fault is indicated and starting is terminated.

If desired, if the block 122 determines that the rotor speed $V_R$ is less than $V_{MIN}$, control may instead return to the block 104 of FIG. 3a where a new start sequence is initiated. Thus, even though the rotor speed has accelerated and decelerated through the start window without ignition having occurred, a subsequent attempt at starting can be undertaken.

The starting system and method of the present invention accomplishes starting in a matter which enhances the reliability thereof, even when conditions would otherwise adversely affect starting performance.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A starting system for a gas turbine engine wherein the gas turbine engine is coupled to a starter and includes a rotor, an igniter and a fuel valve, comprising:

means for actuating the starter to accelerate the rotor during a start sequence;

means for operating the igniter and the fuel valve during the start sequence;

means for developing an indication when ignition has failed to occur during a rotor speed window of the start sequence;

means responsive to the developing means for deactuating the starter to allow the rotor to decelerate when the indication is developed; and means for reactuating the starter subsequent to deactuation thereof if ignition is thereafter detected during the start sequence.

2. The starting system of claim 1, wherein the developing means comprises an exhaust gas temperature sensor.

3. The starting system of claim 1, wherein the developing means comprises a speed sensor.

4. A starting system for a gas turbine engine wherein the gas turbine engine is coupled to a starter and includes a rotor, an igniter, a fuel valve and a combustor, comprising:

means responsive to a start command for actuating the starter, the fuel valve and the igniter during a start sequence;

means for sensing rotor speed;

means responsive to the sensing means for developing an indication when ignition has failed to occur in the combustor by the time a particular rotor speed is reached;

means responsive to the indicating means for deactuating the starter when the indication is developed; and means for reactuating the starter subsequent to deactuation thereof if ignition is thereafter detected during the start sequence.

5. A method of starting a gas turbine engine having a rotor coupled to a starter and further having an igniter and a fuel valve, the method comprising the steps of:

actuating the starter to accelerate the rotor during a start sequence;

operating the igniter and the fuel valve during the start sequence;

developing an indication when ignition has failed to occur during a rotor speed window of the start sequence;

deactuating the starter to allow the rotor to decelerate when the indication is developed; and reactuating the starter subsequent to deactuation thereof if ignition is thereafter detected during the start sequence.

6. The method of claim 5, wherein the step of developing comprises the step of detecting the output of an exhaust gas temperature sensor.

7. The method of claim 5, wherein the step of developing comprises the step of detecting the output of a speed sensor.

8. A method of starting a gas turbine engine having a rotor coupled to a starter and further including an igniter, a fuel valve and a combustor, the method comprising the steps of:

actuating the starter, the fuel valve and the igniter during a start sequence;

sensing rotor speed;

developing an indication when ignition has failed to occur in the combustor by the time a particular rotor speed is reached;

deactuating the starter when the indication is developed; and reactuating the starter subsequent to deactuation thereof if ignition is thereafter detected during the start sequence.

* * * * *